(12) United States Patent
Fairlie et al.

(10) Patent No.: US 11,787,571 B2
(45) Date of Patent: Oct. 17, 2023

(54) SEPARATION DEVICE ASSEMBLIES

(71) Applicant: Ensign-Bickford Aerospace & Defense Company, Simsbury, CT (US)

(72) Inventors: William Fairlie, Agawam, MA (US); Erik Saucier, Vernon, CT (US)

(73) Assignee: Ensign-Bickford Aerospace & Defense Company, Simsbury, CT (US)

( * ) Notice: Subject to any disclaimer, the term of this patent is extended or adjusted under 35 U.S.C. 154(b) by 1237 days.

(21) Appl. No.: 16/203,966

(22) Filed: Nov. 29, 2018

(65) Prior Publication Data

US 2019/0168899 A1    Jun. 6, 2019

Related U.S. Application Data

(60) Provisional application No. 62/593,367, filed on Dec. 1, 2017.

(51) Int. Cl.
  *B64G 1/64* (2006.01)
  *F42B 15/38* (2006.01)

(52) U.S. Cl.
  CPC .............. *B64G 1/645* (2013.01); *F42B 15/38* (2013.01); *F16B 2200/506* (2018.08); *F16B 2200/63* (2023.08)

(58) Field of Classification Search
  CPC . B64G 1/645; B64G 1/64; F16B 2/065; F16B 2200/506; F16B 4/002; F16B 31/005; F42B 15/38; F42B 15/36; Y10T 403/11; Y10T 403/13; Y10T 403/7067; Y10T 403/645
  USPC ...................................... 89/1.14; 411/19, 20
  See application file for complete search history.

(56) References Cited

U.S. PATENT DOCUMENTS

| 3,362,290 A | * | 1/1968 | Carr | F42B 15/36 89/1.14 |
| 3,698,281 A | * | 10/1972 | Brandt | C06C 5/06 102/378 |
| 4,648,227 A | * | 3/1987 | Reusch | F42B 3/093 102/378 |
| 4,685,376 A | | 8/1987 | Noel et al. | |
| 5,109,749 A | * | 5/1992 | Olcer | F42B 15/38 102/378 |
| 5,129,306 A | * | 7/1992 | Fauvel | F42B 15/38 89/1.14 |

(Continued)

FOREIGN PATENT DOCUMENTS

| FR | 3028609 A1 | * | 5/2016 | ............. B64G 1/645 |
| WO | WO 8707006 A1 | * | 5/1987 | |

*Primary Examiner* — Josh Skroupa
(74) *Attorney, Agent, or Firm* — Stephen L. Keefe; McCarter & English, LLP

(57) ABSTRACT

Separation device assemblies include a first plate defining respective contact surfaces and engagement surfaces and a second plate defining a respective contact surfaces and engagement surfaces. A fracture groove is located on separation walls of the first and second plates. A first end member, a second end member, and the separation wall of the first plate define a first plate expansion device channel and the second plate defines a similar second plate expansion device channel. When assembled, the first plate and the second plate form an expansion device cavity and the first and second plates form a frangible joint. The respective engagement surfaces are configured to engage with receiving channels of attachable mounting devices.

18 Claims, 8 Drawing Sheets

(56) References Cited

U.S. PATENT DOCUMENTS

| | | | | |
|---|---|---|---|---|
| 5,390,606 A | * | 2/1995 | Harris | F42B 15/38 |
| | | | | 102/378 |
| 5,392,684 A | * | 2/1995 | Renfro | F42B 15/38 |
| | | | | 89/1.14 |
| 5,535,502 A | | 7/1996 | Harris | |
| 5,898,123 A | | 4/1999 | Fritz et al. | |
| 6,021,715 A | | 2/2000 | Fritz et al. | |
| 6,125,762 A | * | 10/2000 | Fritz | F42B 15/38 |
| | | | | 102/378 |
| 7,127,994 B2 | | 10/2006 | Cleveland | |
| 7,261,038 B2 | | 8/2007 | Cleveland | |
| 8,141,491 B1 | * | 3/2012 | Travis | F42B 15/38 |
| | | | | 102/377 |
| 8,695,473 B2 | * | 4/2014 | Kametz | F42B 15/38 |
| | | | | 89/1.14 |
| 8,727,654 B2 | * | 5/2014 | Graham | F42B 15/38 |
| | | | | 102/378 |
| 9,027,481 B2 | * | 5/2015 | Kister | B64G 1/645 |
| | | | | 89/1.14 |
| 2003/0196544 A1 | | 10/2003 | Cometesse | |
| 2004/0057787 A1 | | 3/2004 | Cleveland | |
| 2005/0193916 A1 | * | 9/2005 | Cleveland | F42B 15/36 |
| | | | | 102/378 |
| 2012/0085222 A1 | * | 4/2012 | Travis | F42B 15/38 |
| | | | | 89/1.14 |
| 2013/0136525 A1 | * | 5/2013 | Graham | B64G 1/641 |
| | | | | 403/2 |
| 2013/0236234 A1 | | 9/2013 | Kaczynski | |

\* cited by examiner

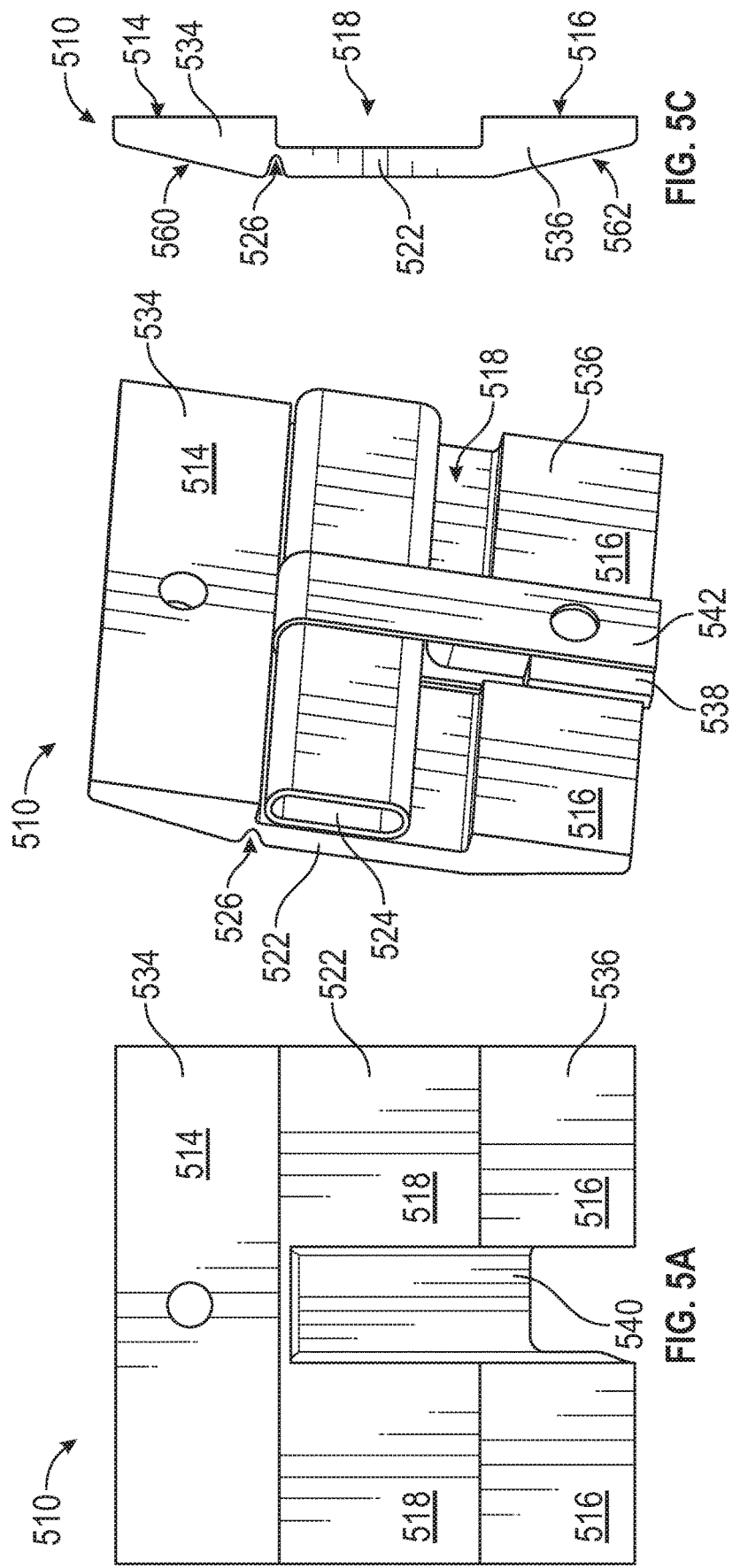

SEPARATION DEVICE ASSEMBLIES

CROSS-REFERENCE TO RELATED APPLICATIONS

The present application claims priority from U.S. Provisional Patent Application Ser. No. 62/593,367, filed Dec. 1, 2017. The contents of the priority application are hereby incorporated by reference in their entirety.

BACKGROUND

The subject matter disclosed herein generally relates to separation device assemblies and, more particularly, to modular frangible joint separation device assemblies.

Linear explosive frangible joints are used to explosively separate two components, such as that of a launch vehicle, satellite, or other type of space or air travel vehicle during flight or operation (e.g., to separate two vehicle stages or to separate a payload from a launch vehicle). For example, it is known to utilize a single, elongated, flexible continuous explosive cord that comprises, e.g., a mild detonating fuse ("MDF") that explodes upon detonation. The explosive cord may be encased in a silicone rubber or other pliable material that is surrounded by a stainless steel tube. This arrangement may be applied to a portion or all of the periphery or circumference of a joint, connection point or location between two components that are desired to be explosively separated at that location at a predetermined time. The explosive cord is typically initiated at one or more ends of the cord and the cord causing the cord to explosively detonate along its length to separate the components.

However, due to the nature of the structural components that are joined (and then separated) by the frangible joints, each application is unique. For example, the frangible joints may include one or more flanges or other structures that are arranged to specifically attach to a portion of the structural component. Each application is different and thus each application may require a different arrangement of flanges or other attachment mechanisms. Accordingly, it may be desirable to improve frangible joints to be more versatile in application.

SUMMARY

According to some embodiments, separation device assemblies are provided. The assemblies include a first plate having a first end member, a second end member, and a separation wall extending between the first end member and the second end member, the first end member and the second end member each defining a respective contact surface and a respective engagement surface, a second plate having a first end member, a second end member, and a separation wall extending between the first end member and the second end member, the first end member and the second end member each defining a respective contact surface and a respective engagement surface, and a fracture groove located on each of the separation walls proximate a respective first end member. The first end member, the second end member, and the separation wall of the first plate define a first plate expansion device channel and the first end member, the second end member, and the separation wall of the second plate define a second plate expansion device channel, When the respective contact surfaces of the first and second end members of the first plate contact the respective contact surfaces of the first and second end members of the second plate, the expansion device channels of the first and second plates form an expansion device cavity. When the respective contact surfaces of the first and second end members of the first and second plates are joined, the first and second plates form a frangible joint. The respective engagement surfaces are configured to engagement with receiving channels of attachable mounting devices.

In addition to one or more of the features described herein, or as an alternative, further embodiments of the separation device assemblies may include an expansion device located within the expansion device cavity.

In addition to one or more of the features described herein, or as an alternative, further embodiments of the separation device assemblies may include a retaining member located within the expansion device cavity and arranged to retain the expansion device to a portion of the first and second plates.

In addition to one or more of the features described herein, or as an alternative, further embodiments of the separation device assemblies may include a positioning member located within the expansion device cavity configured to position the expansion device within the expansion device cavity.

In addition to one or more of the features described herein, or as an alternative, further embodiments of the separation device assemblies may include that the positioning member is integrally formed with at least one of the first plate and the second plate.

In addition to one or more of the features described herein, or as an alternative, further embodiments of the separation device assemblies may include at least one fastener fixedly attaching the first plate to the second plate.

In addition to one or more of the features described herein, or as an alternative, further embodiments of the separation device assemblies may include that the first plate is welded to the second plate.

In addition to one or more of the features described herein, or as an alternative, further embodiments of the separation device assemblies may include a first attachable mounting device attached to the frangible joint at the first end members of the joined first and second plates.

In addition to one or more of the features described herein, or as an alternative, further embodiments of the separation device assemblies may include a second attachable mounting device attached to the frangible joint at the second end members of the joined first and second plates.

In addition to one or more of the features described herein, or as an alternative, further embodiments of the separation device assemblies may include that the first attachable mounting device defines a receiving channel arranged to engage with the engagement surfaces of the first end members.

In addition to one or more of the features described herein, or as an alternative, further embodiments of the separation device assemblies may include that the first attachable mounting device comprises an attachment element and a frame.

In addition to one or more of the features described herein, or as an alternative, further embodiments of the separation device assemblies may include that the frame comprises a first arm, a second arm, and a channel floor, wherein the first arm, the second arm, and the channel floor define a receiving channel for engaging with a portion of the frangible joint.

In addition to one or more of the features described herein, or as an alternative, further embodiments of the separation device assemblies may include that the attachment element is configured to attach to a structural component.

In addition to one or more of the features described herein, or as an alternative, further embodiments of the separation device assemblies may include that the structural component is a portion of a launch vehicle.

In addition to one or more of the features described herein, or as an alternative, further embodiments of the separation device assemblies may include that the attachment element has one of a clevis arrangement, an "L" flange arrangement, or a stock-straight arrangement.

In addition to one or more of the features described herein, or as an alternative, further embodiments of the separation device assemblies may include that the first attachable mounting device includes a positioning member recess for receiving at least one of a positioning member and a retaining member.

In addition to one or more of the features described herein, or as an alternative, further embodiments of the separation device assemblies may include that the first attachable mounting device includes a fastener aperture for receiving a fastener, the fastener fixedly retaining the first end members of the joined first and second plates to the first attachable mounting device.

In addition to one or more of the features described herein, or as an alternative, further embodiments of the separation device assemblies may include that the first attachable mounting device is welded to the first end members of the joined first and second plates.

In addition to one or more of the features described herein, or as an alternative, further embodiments of the separation device assemblies may include a plurality of frangible joints.

According to some embodiments, separation device assemblies and components thereof as shown and described herein are provided.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 5A is a plan view schematic illustration of a plate of a frangible joint in accordance with an embodiment of the present disclosure;

FIG. 5B is a schematic isometric illustration of the plate of FIG. 5A, with various components of a frangible joint installed therein;

FIG. 5C is a cross-sectional schematic illustration of the plate of FIG. 5A;

DETAILED DESCRIPTION

Figure 1:
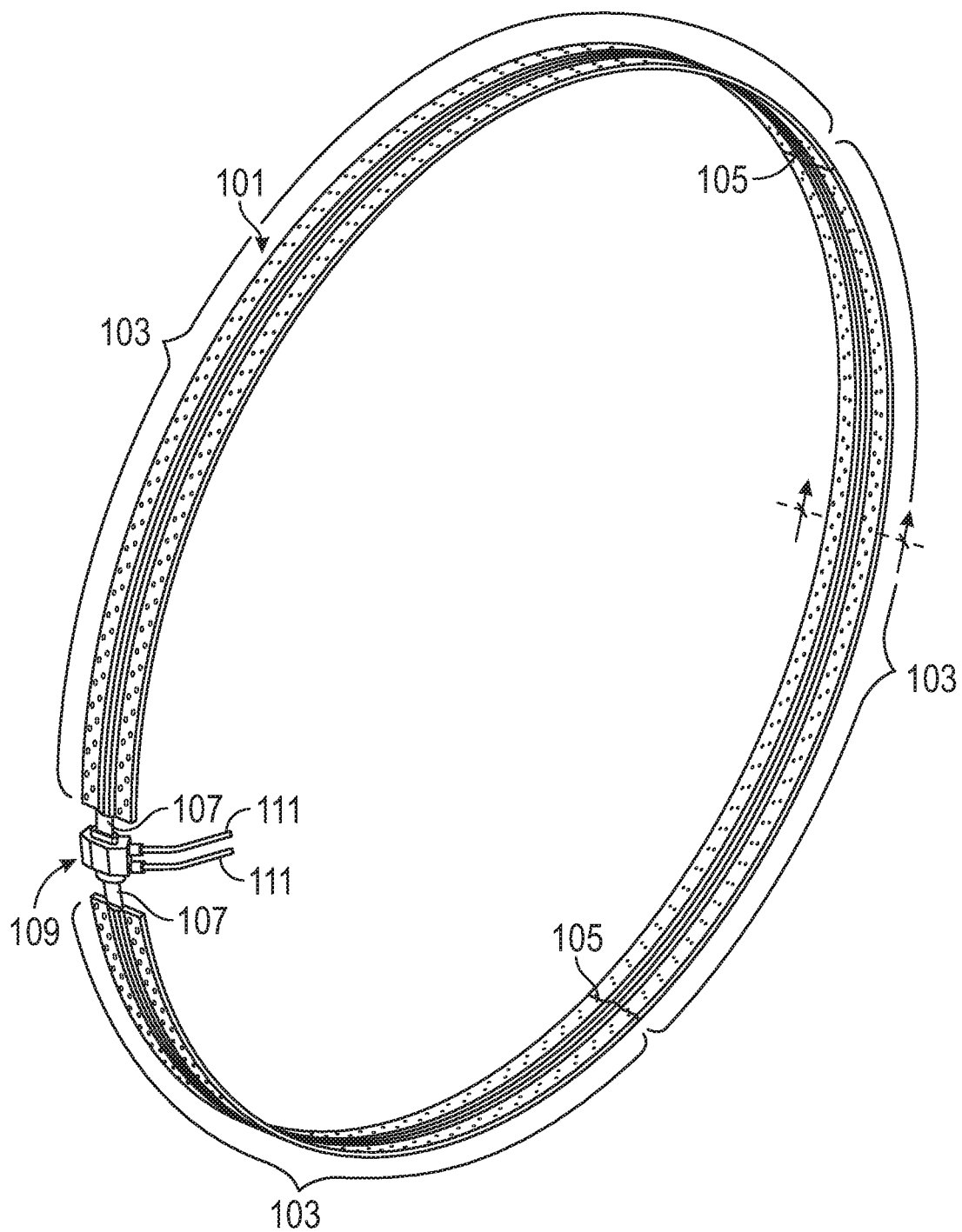
FIG. 1 is a perspective view of a segmented separation structure in accordance with one embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 schematically illustrates a segmented separation structure 101, such as a frangible joint. The segmented separation structure 101, having a plurality of segments 103. The segments 103 are jointed or attached at seams 105, with connections achieved as will be appreciated by those of skill in the art. An expansion device 107 is positioned within the segments 103. The ends of the expansion device 107 are connected to a detonation manifold 109 that is in signal transfer communication with one or more of signal transfer lines 111 in a manner well known to those skilled in the art.

The signal transfer lines 111 are used to communicate an activation signal to the detonation manifold 109. Activation of the detonation manifold 109 triggers expansion of the expansion device 107 within the segments 103. As the expansion device 107 expands, the segments 103 will separate or split apart such that two ends of the segments will separate from each other. In one example, the segmented separation structure 101 can be mounted across two structural components (e.g., portions of a launch vehicle). When the segmented separation structure 101 is commanded to separate, the two structural components can be separated.

The separation structure 101 may have a total assembled length of 20 feet or more. That is, each segment 103 forms a portion of the total assembled length of the separation structure 101. Although shown in FIG. 1 as a circular separation structure 101, those of skill in the art will appreciate that separation structures of the present disclosure need not be circular, but rather may take various shapes or configurations, including arcuate, elliptical, linear, etc.

Figure 2B:
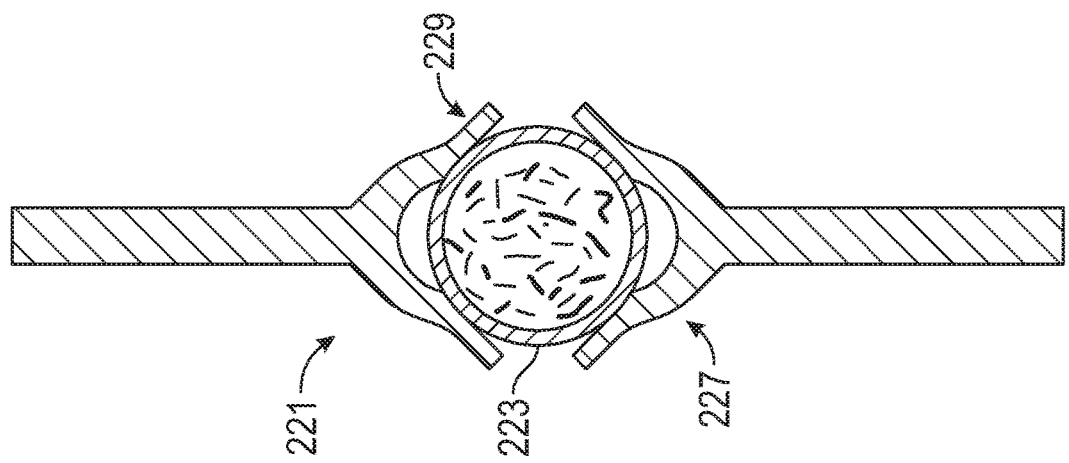
FIG. 2B is a view similar to that of FIG. 2A of the prior art separation device assembly after detonation.
Figure 2A:
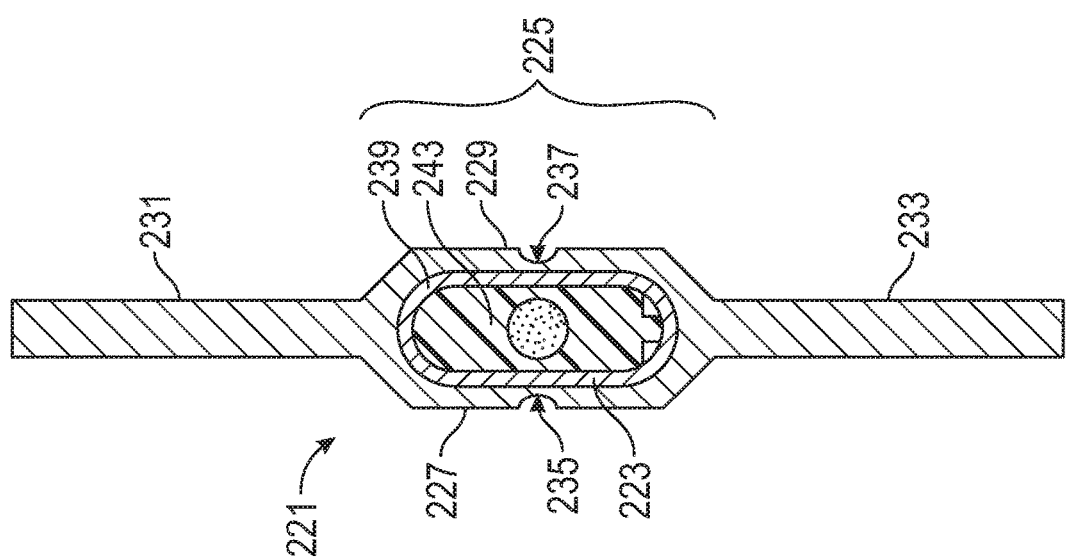
FIG. 2A is a partially cross-sectional view of an example prior art separation device assembly.

Turning now to FIGS. 2A-2B, a typical segment 221 of a separation device assembly is shown in cross section. The segment 221 may be a portion of a separation device assembly such as that shown in FIG. 1. As shown, an expansion device 223 is disposed within a frangible joint 225 which may be an aluminum member having a release portion comprising separation walls 227, 229, which in part define an internal channel, cavity, or chamber for receiving the expansion device 223. As shown, mounting flanges 231, 233 extend from the frangible joint 225 and are each arranged to attach to a portion of a respective structural component. For example, the mounting flanges 231, 233 can be designed to fixedly attach or connect two adjacent structural components, as will be appreciated by those of skill in the art. Thus, the mounting flanges 231, 233 may be customized to a specific application to properly connect to and join two structural components. That is, although shown as flat mounting flanges 231, 233 extending from the frangible joint 225, those of skill in the art will appreciate that various geometries, shapes, sizes, etc. may be employed for the mounting flanges, which can be dictated by specific applications and/or requirements. In the arrangement of FIG. 2A, illustrating pre-separation, the frangible joint 225 of the segment 221 can function like a butt plate between two structural components to be separated.

The expansion device 223 is positioned lengthwise in the channel formed in the frangible joint 225. The separation walls 227, 229 each have fracture grooves 235, 237 that are designed to provide a clean fracture of the separation walls 227, 229 in response to expansion of the expansion device 223. The expansion of the expansion device 223 is achieved by detonation of a charge within an expanding tube assembly 239. As shown, the expanding tube assembly 239 includes an explosive charge 241 within an explosive charge holder 243. Activation (detonation) of the explosive charge 241 of the expanding tube assembly 239 will cause the expansion device 223 to expand laterally outward to a substantially circular cross-sectional configuration as shown in FIG. 2B. As the expansion device 223 expands it will apply force upon the separation walls 227, 229 along the length of the segment 221. The force applied by the expanding expansion device 223 will cause the separation walls 227, 227 to break or fail at the fracture grooves 235, 237, thus separating the two mounting flanges 231, 233 from each other at the location of the frangible joint 225. That is, the mounting flanges 231, 233 and any associated structural components are separated upon detonation of the expanding tube assembly 239 and expansion of the expansion device 223.

As shown in FIGS. 2A-2B, the mounting flanges 231, 233 are integrally formed with the frangible joint 225 as a unitary body or structure, with the expanding tube assembly 239 located therein. As noted above, the shape, size, dimensions, etc. of the mounting flanges 231, 233 are customized to application specifications. Thus, each time a new arrangement of structural component to be separated is designed, a new and specifically customized separation device assembly must be designed and prepared.

Embodiments provided herein are directed to modular separation device assemblies that enable different mounting flanges to be installed to a frangible joint, without requiring re-design each time a new configuration is developed. The modular separation device assemblies described herein provide structural integrity and are integral in providing adequate stiffness during function/separation. The frangible joints of the present disclosure are separate from the mounting flanges and are of a uniform design. Thus, the frangible joints may be manufactured in high volume and used for any structural component arrangement, and only customized mounting flanges may be required.

Figure 3A:
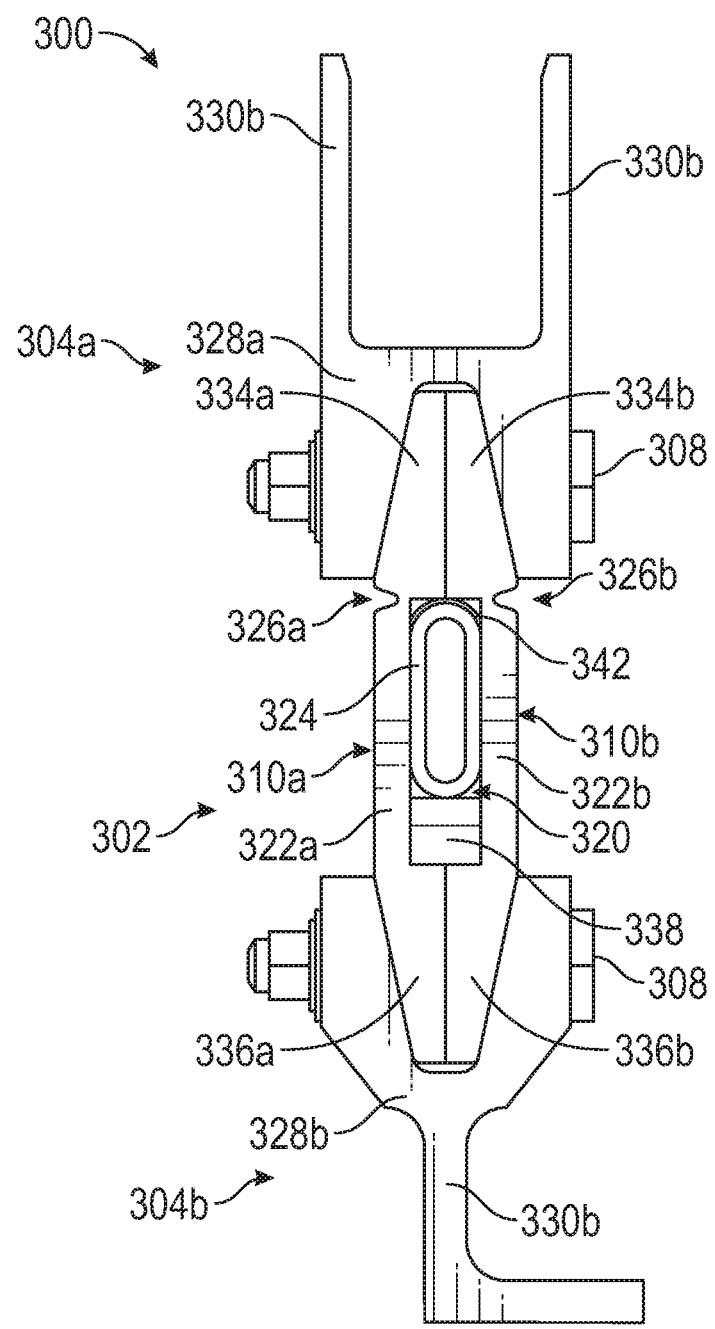
FIG. 3A is a schematic cross-sectional illustration of a portion of a separation device assembly in accordance with an embodiment of the present disclosure.
Figure 3B:
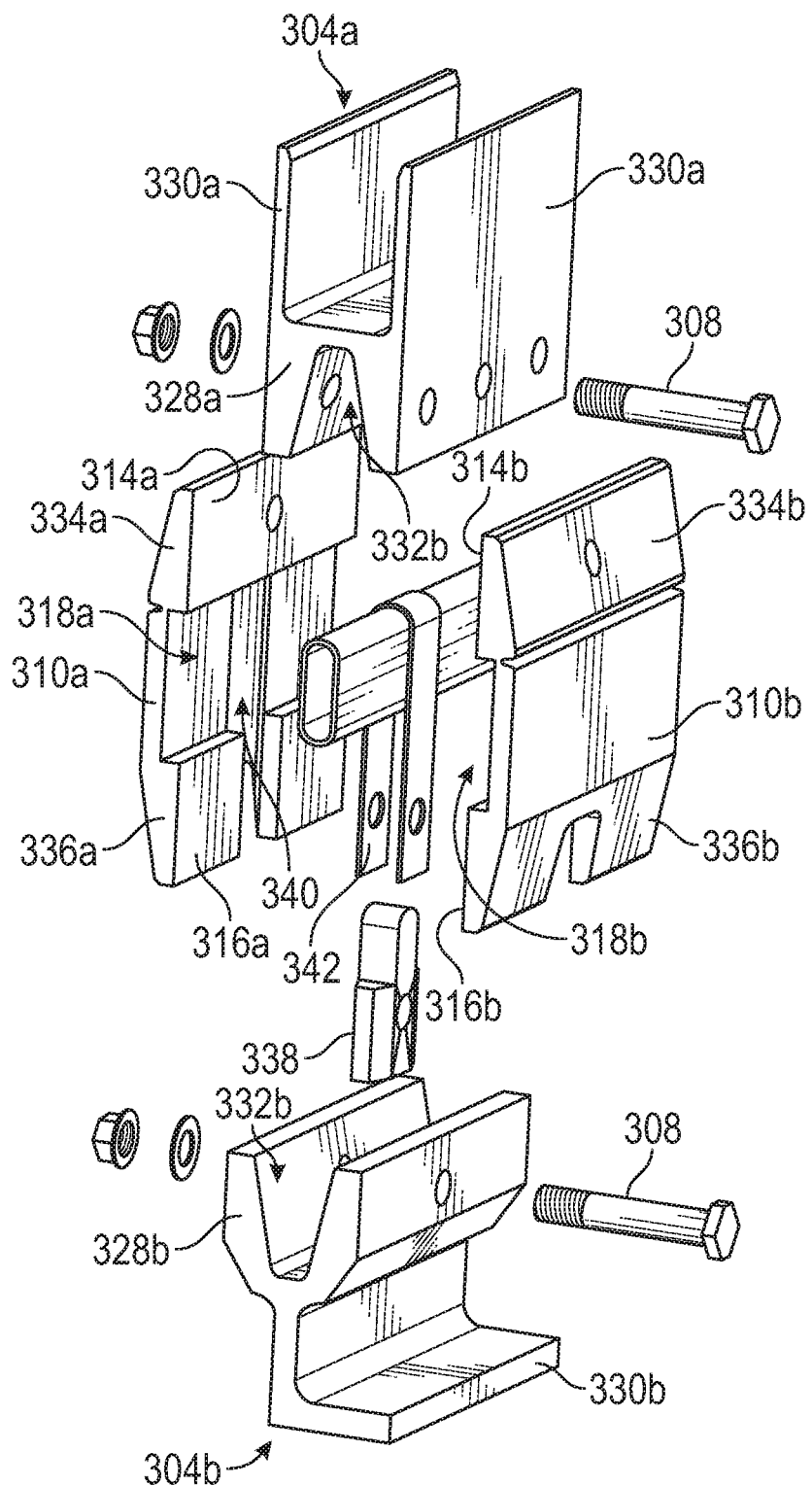
FIG. 3B is a schematic illustration of an unassembled, isometric view of the separation device assembly shown in FIG. 3A.

Turning now to FIGS. 3A-3B, schematic illustration of a portion of a separation device assembly 300 is shown. FIG. 3A illustrates a cross-section view of the separation device assembly 300 and FIG. 3B illustrates an exploded, isometric illustration of the separation device assembly 300.

As shown in FIGS. 3A-3B, the separation device assembly 300 includes a frangible joint 302, a first attachable mounting device 304a, and a second attachable mounting device 304b, with the first and second attachable mounting devices 304a, 304b attached to the frangible joint 302 by one or more fasteners 308. In some embodiments, the first and second attachable mounting devices 304a, 304b are removably or releasably attached to the frangible joint 302, and in other embodiments, a fixed or permanent attachment may be employed. As shown, the fasteners 308 are bolts, although other types of fasteners and/or interlocking structures may be employed without departing from the scope of the present disclosure. Further, in some embodiments, rather than physical attachment mechanisms (e.g., fasteners), other types of attachment may be employed, including adhesives, welding, brazing, etc. That is, the fasteners 308 are optional and will depend on the specific arrangement and/or requirements of a particular application.

The frangible joint 302 is a modular assembly, and as shown is a two-part arrangement. That is, in accordance with embodiments of the present disclosure, the frangible joint 302 includes a first plate 310a and a second plate 310b. The first and second plates 310a, 310b, in some embodiments, are identical or symmetrical in shape and structure, although, in some embodiments, one or the other of the plates 310a, 310b may include specific features that are not mirrored in the other of the plates 310a, 310b. The plates 310a, 310b are joinable to form the frangible joint 302. For example, as shown in FIG. 3B, the first plate 310a includes a first contact surface 314a and a second contact surface 316a and the second plate 310b includes a first contact surface 314b and a second contact surface 316b. The first and second contact surfaces 314a, 314b, 316a, 316b of the two plates 310a, 310b are arranged such that a complete and, in some embodiments, sealed contact is achieved.

Each plate 310a, 310b also includes a respective expansion device channel 318a, 318b. The expansion device channels 318a, 318b are arranged to form an expansion device cavity 320 when the plates 310, 310b are joined together. The expansion device channels 318a, 318b are defined, in part, by respective separation walls 322a, 322b of the plates 310a, 310b.

As shown in FIG. 3A, an expansion device 324, such as an expansion tube, is positioned and contained within the expansion device cavity 320, e.g., between the separation walls 322a, 322b. The shape and/or geometry of the separation walls 322a, 322b may be configured to accommodate the shape of a corresponding expansion device 324 that is installed within the expansion device cavity 320. The expansion device 324 may be configured as will be appreciated by those of skill in the art. For example, the expansion device 324 can be filled with a charge (e.g., explosives and/or a fuse) that are arranged to expand upon detonation and apply a force within the expansion device 324. As noted, the expansion device 324 is contained or held within the expansion device cavity 320 between the two plates 310a, 310b, and in an embodiment, between the separation walls 322a, 322b of the plates 310a, 310b. When the expansion device 324 expands, it will apply a shock and force upon the separation walls 322a, 322b to thus break or separate the frangible joint 302. Each of the plates 310a, 310b includes a fracture groove 326a, 326b to aid in the separation of the frangible joint 302 when the expansion device 324 expands.

The frangible joint 302 is positioned within parts of the first and second attachable mounting devices 304a, 304b. The first attachable mounting device 304a includes a frame 328a and an attachment element 330a that is arranged to attached to or mount the separation device assembly 300 to a first structural component. Similarly, the second attachable mounting device 304b includes a frame 328b and an attachment element 330b that is arranged to attached to or mount the separation device assembly 300 to a second structural component. As shown, the frames 328a, 328b are yolk-shaped, having first and second arms that are arranged to receive portions of the plates 310a, 310b (as described herein). The yolk-shape shown herein is merely for example, and the frames 328a, 328b can take various shapes based on specific needs or requirements for a particular application. Further, the attachment elements 330a, 330b can have any shape and/or configuration to enable attachment and mounting to a structural component, as will be appreciated by those of skill in the art.

The frames 328a, 328b each define a respective receiving channel 332a, 332b. The receiving channels 332a, 332b are shaped substantially similar to each other and are arranged to receive end members of the frangible joint 302 such that the assembly of these parts create a required structural integrity of the assembly. For example, as shown in FIG. 3A-3B, the first plate 310a includes a respective first end member 334a and a second end member 336a and the second end plate 310b includes a respective first end member 334b and a second end member 336b. As shown, the separation walls 322a, 322b extend between the first and second end members 334a, 336a, 334b, 336b respectively. The receiving channels 332a, 332b are shaped to receive the end members 334a, 336a, 334b, 336b, when the two plates 310a, 310b are fit together to form the expansion device cavity 320, as shown. In the present illustrations, the fracture grooves 326a, 326b are positioned between the separation walls 322a, 322b and the first end members 334a, 334b.

In the embodiment of FIGS. 3A-3B, the expansion device 324 is positioned within the expansion device cavity 320 using a positioning member 338. The positioning member 338 can fit within one of the receiving channels, e.g., the receiving channel 332b of the frame 328b of the second attachable mounting device 304b, and/or into a positioning member groove 340 of one or both of the plates 310a, 310b. Further, the positioning member 338 is held or positioned between the separation walls 322a, 322b, as shown. In some embodiments, the positioning member 338 is positioned equally between the separation walls 322a, 322b.

As shown, a retaining member 342 can wrap about the expansion device 324 such that upon expansion of the expansion device 324 the expansion device 324 is held or retained with one of the attachable mounting devices 304a, 304b. In this illustrative embodiment, one of the fasteners 308 passes through an arm or portion of the frame 328b of the second attachable mounting device 304b, into and through a portion of the retaining member 342, through the positioning member 338, again through the retaining member 342, and out through an opposing arm or portion of the frame 328b. In some embodiments, the fastener 308 may also pass through portions of the plates 310a, 310b to retain the plates 310a, 310b within the receiving channel 332b.

Although not shown, a plurality of fasteners 308 may be positioned along an entire length of the separation device assembly 300 to fixedly attach the various components thereof. That is, although shown with only one fastener 308 for the attachment of the first attachable mounting device 304a and one fastener 308 for the attachment of the second attachable mounting device 304b, those of skill in the art will appreciate that additional fasteners 308 can be employed to secure the attachment therebetween.

Figure 4A:
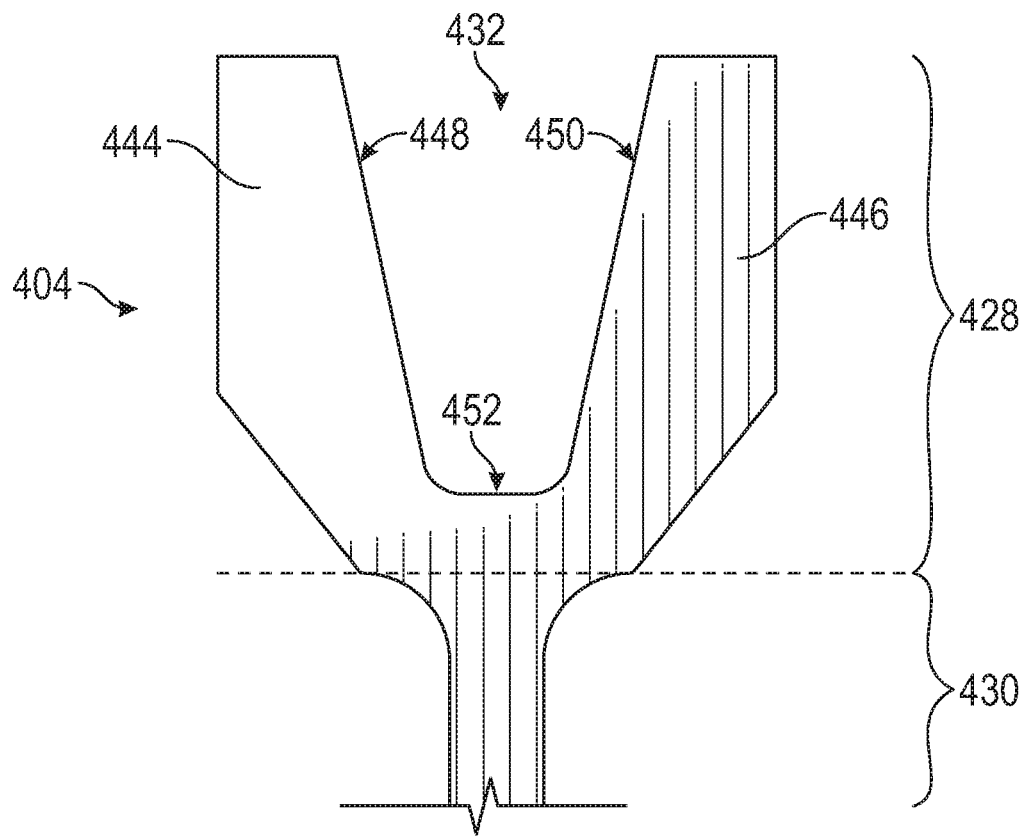
FIG. 4A is a schematic cross-sectional illustration of an attachable mounting device in accordance with the present disclosure.
Figure 4B:
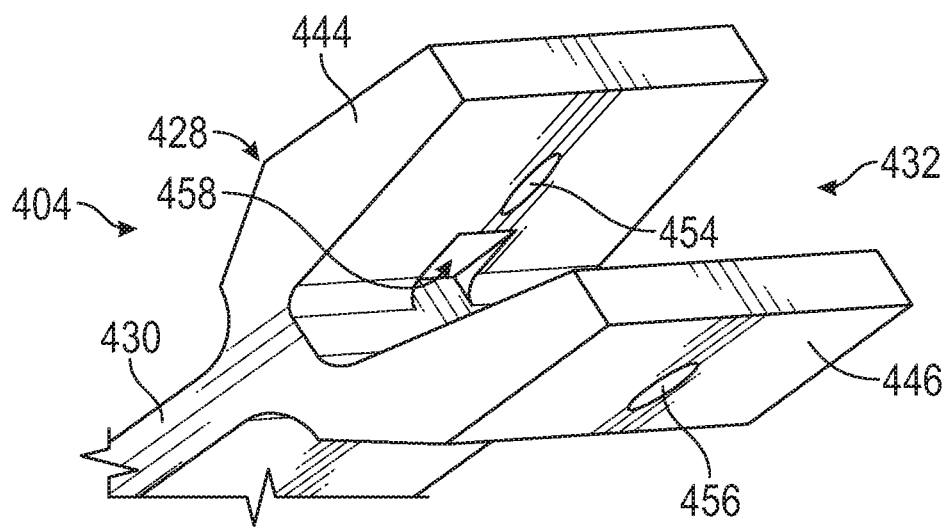
FIG. 4B is an isometric illustration of the attachable mounting device of FIG. 4A.

Turning now to FIGS. 4A-4B, schematic illustrations of an attachable mounting device 404 in accordance with an embodiment of the present disclosure. FIG. 4A is a cross-sectional illustration of the attachable mounting device 404 and FIG. 4B is an isometric illustration of the attachable mounting device 404. The attachable mounting device 404 includes a frame 428 and an attachment element 430. The attachment element 430 can take any number of configurations (e.g., shapes, sizes, number of features, etc.). The attachment element 430 extends from the frame 428 and is arranged to enable attachment to a structural component.

The frame 428 includes a first arm 444 and a second arm 446. The first and second arms 444, 446 define a receiving channel 432 therebetween. The receiving channel 432 is defined by a first arm contact surface 448, a second arm contact surface 450, and a channel floor 452. The first arm contact surface 448, the second arm contact surface 450, and the channel floor 452 define a contour or shape that is arranged to receive a portion of a frangible joint, as shown and described above.

As shown in FIG. 4B, the first arm 444 has a fastener aperture 454 and the second arm 446 has respective fastener aperture 456 that aligns with the fastener aperture 454 of the first arm. Thus, a fastener can pass through both fastener apertures 454, 456 of the frame 428 and secure a frangible joint within the receiving channel 432. Also show, the frame 428 includes a positioning member recess 458, which can be formed in the contour defined by the first arm contact surface 448, the second arm contact surface 450, and the channel floor 452. The positioning member recess 458 is arranged to receive a portion of a position member and/or a portion of a retaining member (e.g., positioning member 338 and/or retaining member 342 shown in FIGS. 3A-3B). The positioning member recess 458 may be aligned with the fastener apertures 454, 456 to allow for a fastener to also pass through a portion of the positioning member and/or a retaining member. Although shown with a single fastener aperture 454, 456 formed in each arm 444, 446, those of skill in the art will appreciate that any number of fastener apertures can be formed with the arms 444, 446 of the frame 428, with each set of fastener apertures arranged to align with apertures of a frangible joint (e.g., components of frangible joint 302 shown in FIGS. 3A-3B).

Turning now to FIGS. 5A-5C, schematic illustrations of a plate 510 that forms one half of a frangible joint in accordance with the present disclosure are shown. FIG. 5A is a plan view illustration of the plate 510, FIG. 5B is an isometric illustration of the plate 510 with various components installed therein, and FIG. 5C is a cross-sectional or end-on view illustration of the plate 510. The plate 510 is a segment or portion of a half of a separation device assembly (e.g., a portion of a segment of a segmented separation structure as shown in FIG. 1).

As shown, the plate 510 is similar to that shown and described above. That is, the plate 510 includes a first end member 534, a second end member 536, and a separation wall 522 extending therebetween. A fracture groove 526 is located between a portion of the separation wall 522 and the first end member 534 to enable breaking or separation of the plate 510 upon expansion of an expansion device 524 (shown in FIG. 5B). The plate 510 can sit within a receiving channel of a frame of an attachable mounting device as described above.

The first end member 534 defines a first contact surface 514 and the second end member 536 defines a second contact surface 516. The contact surfaces 514, 516 are configured to engage or contact with contact surfaces of a second plate to (not shown) form a frangible joint. The contact surfaces 514, 516 are interior surfaces of the plate 510, when arranged relative to another plate. The end members 534, 536 also include exterior engagement surfaces 560, 562, respectively. The engagement surfaces 560, 562 are configured to engagement or fit within and match a contour of receiving channel of a frame (e.g., the contour defined by the first arm contact surface 448, the second arm contact surface 450, and the channel floor 452 of the frame 428 shown in FIGS. 4A-4B). As shown, the engagement surfaces 560, 562 are tapered, or angled relative to the contact surfaces 514, 516 such that they match the contour of the receiving channel. However, in other embodiments, the engagement surfaces of the end members can have any shape, size, dimension, geometry, engagement/locking features, etc.

The separation wall 522 defines an expansion device channel 518 for receiving the expansion device 524 (as shown in FIG. 5B). When two plates 510 are joined together, the expansion device channels 518 align to define an expansion device cavity (e.g., expansion device cavity 320 shown in FIG. 3A). Further, when two plates are matched together to form a portion of a frangible joint, two positioning member grooves 540 align to house and retain a positioning member 538 and/or a retaining member 542.

Figure 6:
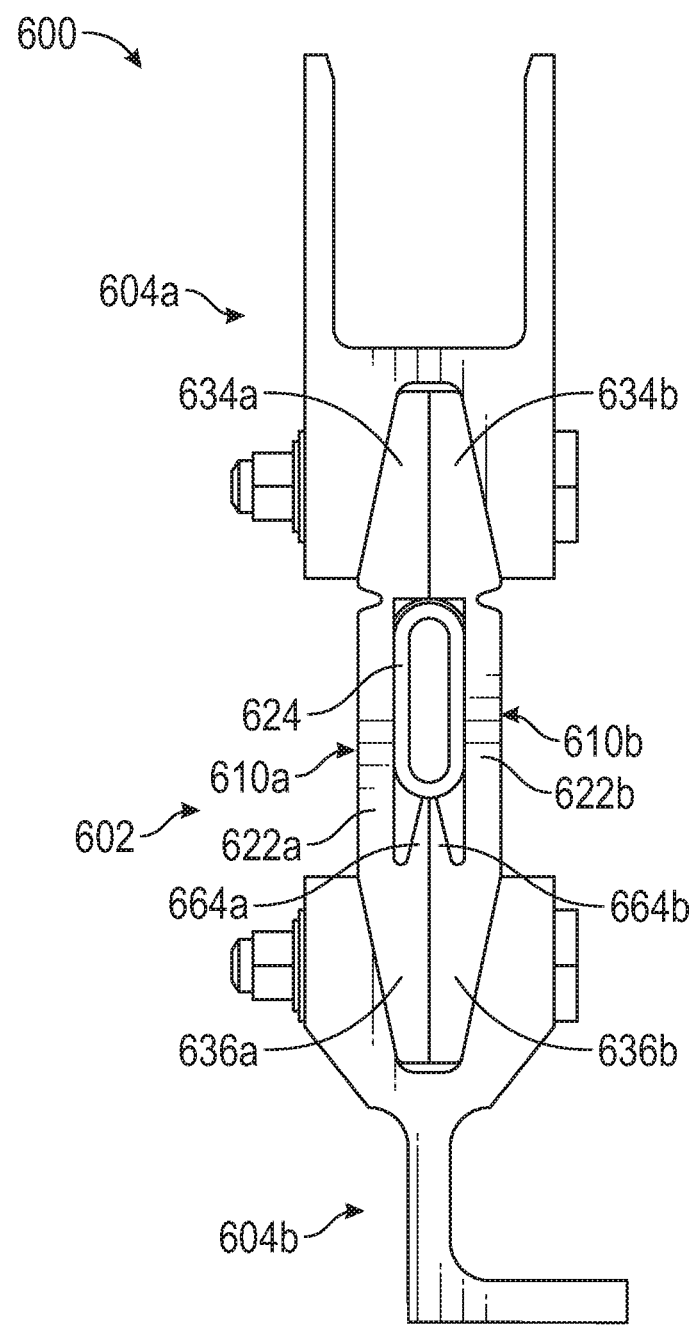
FIG. 6 is a schematic illustration of a separation device assembly in accordance with an embodiment of the present disclosure.
Figure 7D:
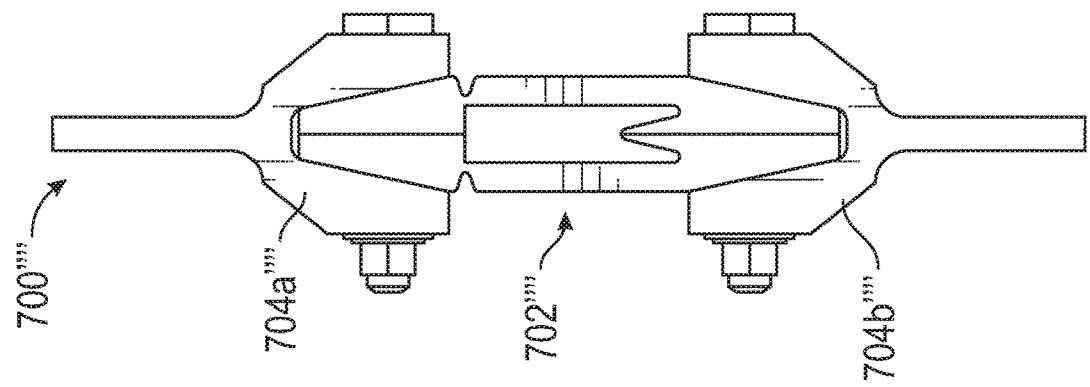
FIG. 7D is a schematic illustration of a configuration of a separation device assembly in accordance with the present disclosure.
Figure 7C:
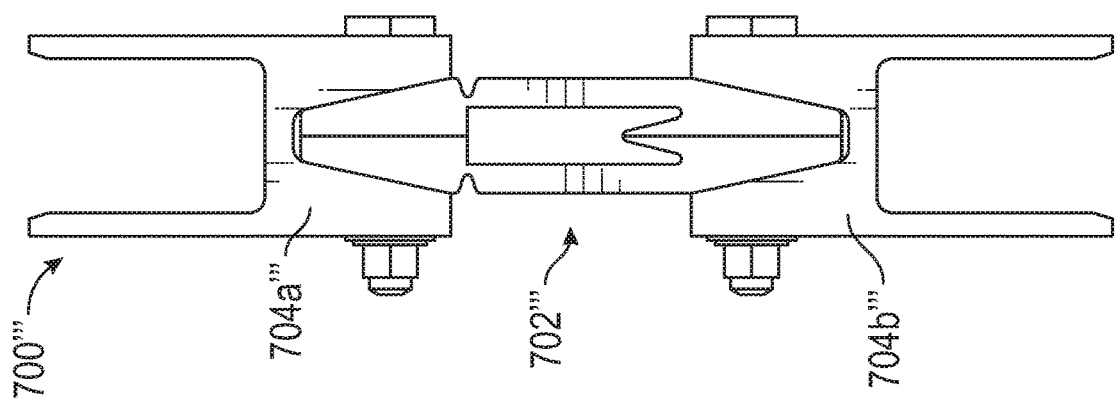
FIG. 7C is a schematic illustration of a configuration of a separation device assembly in accordance with the present disclosure.
Figure 7B:
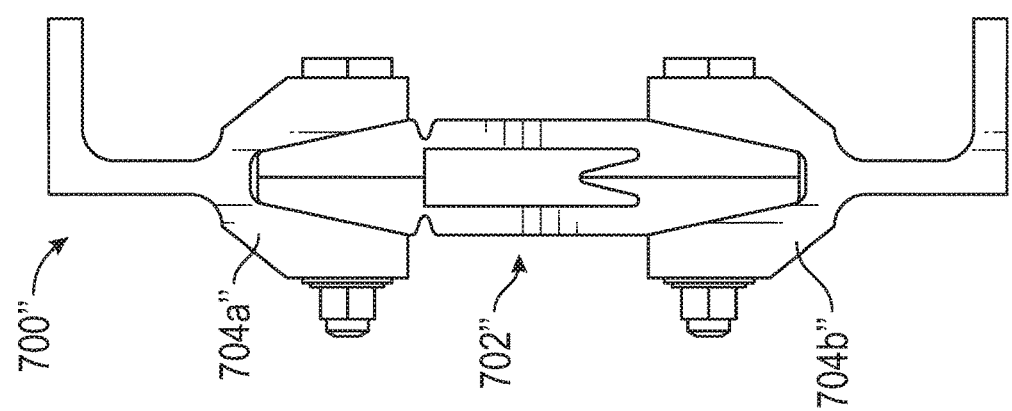
FIG. 7B is a schematic illustration of a configuration of a separation device assembly in accordance with the present disclosure.
Figure 7A:
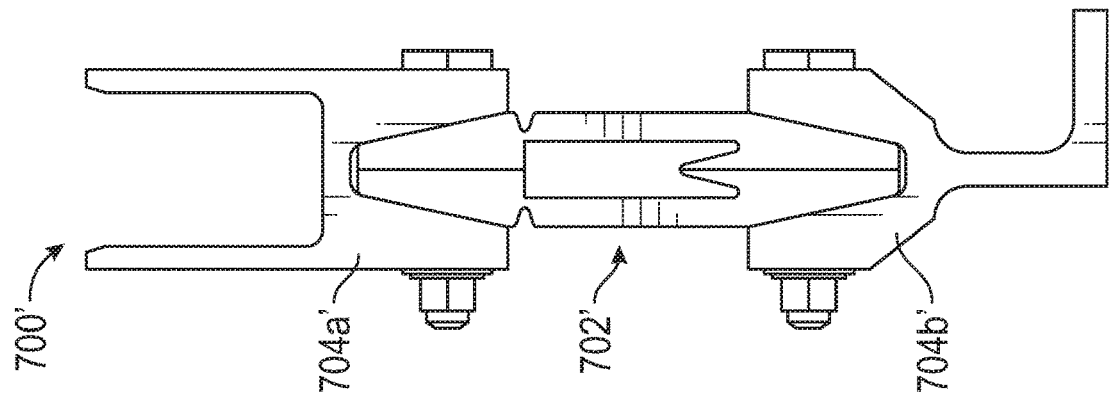
FIG. 7A is a schematic illustration of a configuration of a separation device assembly in accordance with the present disclosure.

Turning not to FIGS. 6, a schematic illustration of another embodiment of a separation device assembly 600 in accordance with the present disclosure are shown. The separation device assembly 600 is substantially similar to that shown and described above and thus description of some features will not be repeated. As shown, the separation device assembly 600 includes a frangible joint 602 with first and second attachable mounting devices 604a, 604b. The frangible joint 602 is formed from a first plate 610a and a second plate 610b that contain an expansion device 624 therein. Each plate 610a, 610b includes a first end member 634a, 634b, second end member 636a, 636b, and separation walls 622a, 622b extending therebetween. In this embodiment, rather than a separate positioning member to position the expansion device 624 in an expansion device cavity, the plates 610a, 610b each include integral positioning arms 664a, 664b. As shown, the integral positioning arms 664a, 664b are integrally formed with the respective end members 636a, 636b of the plates 610a, 610b. In an embodiment, the arms 664a, 664b each have a planar surface and an opposing tapered surface. The planar surfaces being in contact when the plates 610a, 610b are assembled. In some embodiments, a combination of integral positioning arms and separate positioning members may be employed, without departing from the scope of the present disclosure.

Turning now to FIGS. 7A-7D, example illustrations of different configurations of attachable mounting devices for separation device assemblies in accordance with the present disclosure are shown. As shown, a first separation device assembly 700' (FIG. 7A) has a frangible joint 702' with a first attachable mounting device 704a' and a second attachable mounting device 704b' attached thereto. The first attachable mounting device 704a' has a clevis arrangement and the second attachable mounting device 704b' has an "L" flange arrangement. A second separation device assembly 700''' (FIG. 7B) has a frangible joint 702'' with a first attachable mounting device 704a''' having an "L" flange arrangement and a second attachable mounting device 704b''' having an "L" flange arrangement attached thereto. A third separation device assembly 700''' (FIG. 7C) has a frangible joint 702''' with a first attachable mounting device 704a''' having a clevis arrangement and a second attachable mounting device 704b''' having a clevis arrangement attached thereto. A fourth separation device assembly 700'''' (FIG. &D) has a frangible joint 702'''' with a first attachable mounting device 704a'''' having a stock-straight arrangement and a second attachable mounting device 704b'''' having a stock-straight arrangement attached thereto. The stock-straight arrangement can be used as-is for attaching to structural components or may be machined or rolled into a desirable geometry for attaching to structural components.

FIGS. 7A-7D are illustrative of the modular nature of the separation device assemblies of the present disclosure. As shown, each of the frangible joints 702', 702'', 702''', 702'''' is the same as the others, illustrating the uniform nature and interchangeability of attachable mounting devices. Any combination of attachable mounting devices can be employed to suit a given scenario. Further, although illustratively shown with the frangible joints 702', 702'', 702''', 702'''' having integral positioning arms, as shown and described above, the specific structure and/or arrangement of the frangible joints can be any of the above described embodiments and/or variations thereon.

That is, the attachment elements of the attachable mounting devices of the present disclosure can take any shape, geometry, and/or orientation, and yet still be attachable to a standard or universal frangible joint due to engage with the frames of the attachable mounting devices. Stated another way, the frames of the attachable mounting devices are also uniform or universal and the attachment elements are variable. In some embodiments, only the interior contour of the frame (e.g., the receiving channel) of the attachable mounting devices need be uniform, and the exterior surfaces thereof can be arrange or designed for specific applications, if required.

Advantageously, embodiments described herein provide frangible joints that can be manufactured in high quantities, regardless of the specific application for joining (and then separating) structural components (e.g., components of spacecraft, launch vehicles, etc.). That is, frangible joints in accordance with embodiments of the present disclosure can be manufactured to a specific, standard design. To then use the universal frangible joints, modular attachment features can be customized and attached to the universal frangible joints. For example, differently configured and/or arranged attachable mounting devices can be selected to cater to a specific application or structural component.

Components of the present disclosure, including the plates of the frangible joints and/or the attachable mounting devices can be fabricated using various techniques. For example, machining, extruding, and/or additive manufacturing can be employed without departing from the scope of the present disclosure.

The frangible joints of the present disclosure, in one non-limiting example, are low profile, two-plate frangible joint structural assemblies with modular vehicle attachment features. Symmetrical frangible joint features (e.g., end members, contact surfaces, separation walls, etc.) and/or symmetrical features of the frames of the attachable mounting devices can simplify and/or standardize manufacturing processes, thus reducing costs. Further, such standardization allows for customization of only the attachment elements, which can further reduce costs associated with manufacturing separation structures as compared to prior arrangements where the entire segmented separation structure was manufactured (start to finish) for a specific and particular application, which can be costly.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A separation device assembly comprising:
  a first plate having a first end member, a second end member, and a separation wall extending between the first end member and the second end member with a fracture groove located proximate the first end member, the first end member and the second end member each defining a respective contact surface and a respective engagement surface, wherein the contact surface of the second end member comprises a positioning member groove configured to receive a portion of at least one of a positioning member or a retaining member;
  a second plate having a first end member, a second end member, and a separation wall extending between the first end member and the second end member with a fracture groove located proximate the first end member, the first end member and the second end member each defining a respective contact surface and a respective engagement surface, wherein the contact surface of the second end member comprises a positioning member groove configured to receive a portion of the at least one of the positioning member or the retaining member; and
  wherein the first end member, the second end member, and the separation wall of the first plate define a first plate expansion device channel and the first end member, the second end member, and the separation wall of the second plate define a second plate expansion device channel,
  wherein, when the respective contact surfaces of the first and second end members of the first plate contact the respective contact surfaces of the first and second end members of the second plate, the expansion device channels of the first and second plates form an expansion device cavity in which an expansion device is disposed,
  wherein, when the respective contact surfaces of the first and second end members of the first and second plates are joined, the first and second plates form a frangible joint;
  wherein the respective engagement surfaces are configured to engage with receiving channels of attachable mounting devices; and
  wherein the positioning member or the retaining member supports the expansion device off-centered to a side of the expansion device cavity.

2. The separation device assembly of claim 1, wherein the retaining member is located at least partially within the positioning member grooves of the first and second plates and within the expansion device cavity and arranged to retain the expansion device to a portion of the first and second plates.

3. The separation device assembly of claim 1, wherein the positioning member is located at least partially within the positioning member grooves of the first and second plates and within the expansion device cavity configured to position the expansion device within the expansion device cavity.

4. The separation device assembly of claim 3, wherein the retaining member wraps about the expansion device and the positioning member.

5. The separation device assembly of claim 1, further comprising at least one fastener fixedly attaching the first plate to the second plate.

6. The separation device assembly of claim 1, wherein the first plate is welded to the second plate.

7. The separation device assembly of claim 1, further comprising a first attachable mounting device attached to the frangible joint at the first end members of the joined first and second plates.

8. The separation device assembly of claim 7, further comprising a second attachable mounting device attached to the frangible joint at the second end members of the joined first and second plates.

9. The separation device assembly of claim 7, wherein the first attachable mounting device defines a receiving channel arranged to engage with the engagement surfaces of the first end members.

10. The separation device assembly of claim 7, wherein the first attachable mounting device comprises an attachment element and a frame.

11. The separation device assembly of claim 10, wherein the frame comprises a first arm, a second arm, and a channel floor, wherein the first arm, the second arm, and the channel floor define a receiving channel for engaging with a portion of the frangible joint.

12. The separation device assembly of claim 10, wherein the attachment element is configured to attach to a structural component.

13. The separation device assembly of claim 12, wherein the structural component is a portion of a launch vehicle.

14. The separation device assembly of claim 10, wherein the attachment element has one of a clevis arrangement, an "L" flange arrangement, or a stock-straight arrangement.

15. The separation device assembly of claim 7, wherein the first attachable mounting device includes a positioning member recess for receiving at least one of a positioning member and a retaining member.

16. The separation device assembly of claim 7, wherein the first attachable mounting device includes a fastener aperture for receiving a fastener, the fastener fixedly retaining the first end members of the joined first and second plates to the first attachable mounting device.

17. The separation device assembly of claim 7, wherein the first attachable mounting device is welded to the first end members of the joined first and second plates.

18. The separation device assembly of claim 1, further comprising:
- a fastener configured to secure the first plate, the second plate, the positioning member, and the retaining member together; wherein:
- the expansion device is positioned within the expansion device cavity;
- the positioning member is located at least partially within the positioning member grooves of the first and second plates and within the expansion device cavity configured to position the expansion device within the expansion device cavity; and
- the retaining member is located at least partially within the positioning member grooves of the first and second plates and within the expansion device cavity and arranged to retain the expansion device to a portion of the first and second plates.

* * * * *